(12) United States Patent
Meyers et al.

(10) Patent No.: US 9,980,598 B2
(45) Date of Patent: May 29, 2018

(54) VENDING MACHINE HAVING INTEGRATED, USER-ACCESIBLE, SINGLE SERVE BREWER INTERLOCKED WITH AUTHORIZATION UNIT

(71) Applicant: MEYERS MUNCHIES AND VENDING LTD., Sault-Ste-Marie (CA)

(72) Inventors: Curtis Robert Meyers, Sault-Ste-Marie (CA); Roger Vital Robidoux, Sault-Ste-Marie (CA)

(73) Assignee: MEYERS MUNCHIES AND VENDING LTD, Sault-Ste-Marie (CA)

( * ) Notice: Subject to any disclaimer, the term of this patent is extended or adjusted under 35 U.S.C. 154(b) by 743 days.

(21) Appl. No.: 14/473,673

(22) Filed: Aug. 29, 2014

(65) Prior Publication Data

US 2016/0058236 A1    Mar. 3, 2016

(51) Int. Cl.
*A47J 31/40* (2006.01)
*G07F 11/38* (2006.01)
*G07F 13/10* (2006.01)
*G07F 11/72* (2006.01)

(52) U.S. Cl.
CPC ............. *A47J 31/407* (2013.01); *G07F 11/38* (2013.01); *G07F 11/72* (2013.01); *G07F 13/10* (2013.01)

(58) Field of Classification Search
CPC .... A47J 31/407; A47J 31/368; A47J 31/3633; B25B 5/16
USPC .......................................................... 99/290
See application file for complete search history.

(56) References Cited

U.S. PATENT DOCUMENTS

| 3,247,940 A | 4/1966 | Christine et al. |
| 3,561,579 A * | 2/1971 | Allison .................... G07F 11/72 194/219 |
| 4,600,121 A * | 7/1986 | Falk ......................... G07F 5/22 221/130 |

(Continued)

FOREIGN PATENT DOCUMENTS

EP    2661996 A1 * 11/2013

OTHER PUBLICATIONS

Van Houtte, "Coffee at Work", http://www.vanhoutte.com/index.php/en-ca/business/equipment, originally accessed Jun. 30, 2014.

(Continued)

*Primary Examiner* — Omar Flores Sanchez
(74) *Attorney, Agent, or Firm* — Millman IP Inc.

(57) ABSTRACT

A vending machine having a housing incorporating an authorization unit, a storage area for storing vendible product, a dispenser for dispensing the vendible product, and an integrated brewer. The vendible product stored in the storage area comprises a cup containing a brew pack and condiments. The integrated brewer is secured to the housing yet has a user-accessible brew chamber in which a consumer can deposit the brew pack associated with the vendible product in order to brew a hot drink. The dispenser is interlocked with the authorization unit such that the dispenser dispenses vendible product in response to a dispense signal from the authorization unit. The integrated brewer is interlocked with the authorization unit such that the integrated brewer is by default inoperative and becomes operative in response to an asserted operation signal from the authorization unit.

9 Claims, 3 Drawing Sheets

(56) References Cited

U.S. PATENT DOCUMENTS

| | | |
|---|---|---|
| 8,490,542 B2 | 7/2013 | Webster et al. |
| 2007/0195490 A1* | 8/2007 | Howell ............... E05B 47/0673 361/600 |
| 2014/0260999 A1* | 9/2014 | Cardonick ............ A47J 31/407 99/290 |
| 2017/0011384 A1* | 1/2017 | Tkachenko ........ G06Q 20/3278 |

OTHER PUBLICATIONS

Avanti Vending Machines, "Modular Vending", 2013 Multi-Max Catalog, http://avantius.us/estore/images/MODVENDING.pdf, originally accessed Jun. 30, 2014.

Luigi Lavazza, S.P.A., http://www.lavazza.com/en/at-office/espresso_blue/machine/canto/, originally accessed Jun. 30, 2014.

* cited by examiner

VENDING MACHINE HAVING INTEGRATED, USER-ACCESIBLE, SINGLE SERVE BREWER INTERLOCKED WITH AUTHORIZATION UNIT

FIELD OF INVENTION

The invention relates to vending machines.

BACKGROUND OF INVENTION

Vending machines for hot beverages are well known. At the top end of the scale are the fully automatic machines which have cup dispensing systems that drop a cup into a pouring position and brew the hot beverage into the cup. At the bottom end of the scale are simpler vending machines that simply vend a coffee packet and rely on the consumer to brew his or her own hot beverage. The problem with the high end fully automatic machines is that they are expensive. The problem with the low end machines is that they are not effective. A better solution is sought.

SUMMARY OF INVENTION

In an aspect, a vending machine is provided which includes a housing incorporating an authorization unit, a storage area for storing vendible product, a dispenser for dispensing the vendible product, and an integrated brewer. The vendible product stored in the storage area comprises a cup containing a brew pack and condiments. The integrated brewer is secured to the housing yet has a user-accessible brew chamber in which a consumer can deposit the brew pack associated with the vendible product in order to brew a hot drink. The dispenser is interlocked with the authorization unit such that the dispenser dispenses vendible product in response to a dispense signal from the authorization unit. The integrated brewer is interlocked with the authorization unit such that the integrated brewer is by default inoperative and becomes operative in response to an asserted operation signal from the authorization unit.

BRIEF DESCRIPTION OF DRAWINGS

The foregoing and other aspects of the invention will be more readily appreciated having regard to the attached drawings, wherein.

DETAILED DESCRIPTION OF EXAMPLES EMBODIMENTS

Figure 1:
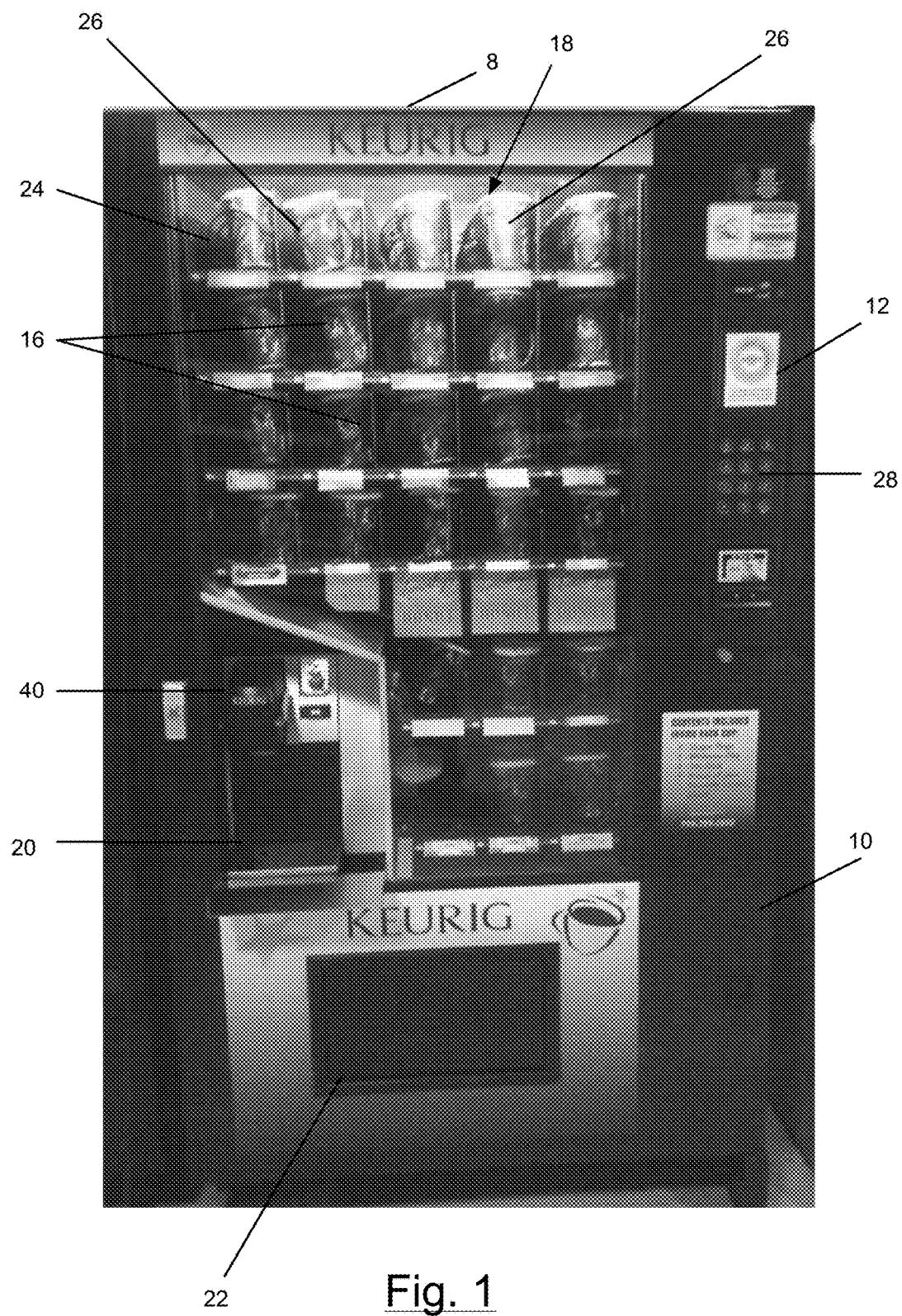
FIG. 1 is a diagram of a hot beverage vending machine according to an example of the invention.

FIG. 1 shows a hot beverage vending machine 8 according to a preferred embodiment. The vending machine comprises a housing 10 in which are incorporated: an authorization unit such as the illustrated money handling mechanism 12; a product storage area 14, which may be viewable and segmented into a variety of cubicles 16; a dispensing mechanism 18; an integrated, user-accessible, brewer 20; and an access door 22 enabling the consumer to retrieve vended product.

Figure 2:
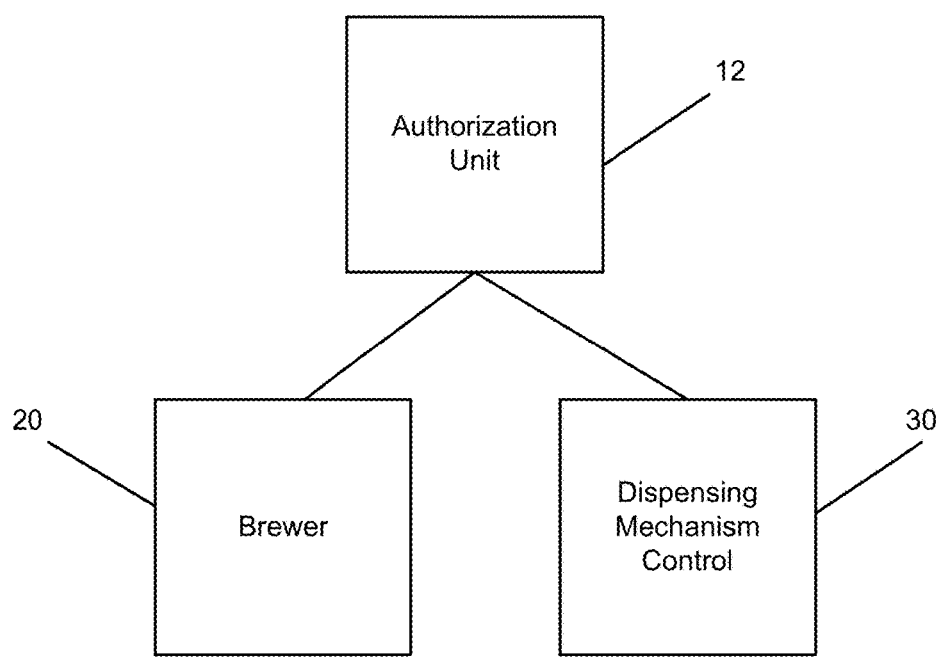
FIG. 2 is a system block diagram of the vending machine shown in FIG. 1.

In the illustrated embodiment the dispensing mechanism 18 comprises a motorized spiral feed 24 which is installed in each cubicle 16 for dispensing individual vendible products 26 placed between individual coils of the spiral feed 24. After the consumer provides the requisite payment to the money handling mechanism 12 and selects a cubicle 16 using a keypad 28, the money handling mechanism 12 sends a dispense signal to a dispensing mechanism control 30 that rotates the spiral feed 24 corresponding to the selected cubicle 16 to dispense one of the products 26, as known in the art per se. The dispensed product 26 can thereafter be retrieved through the access door 22. A system block diagram of the vending machine is shown in FIG. 2.

It should be appreciated that the vending machine is not limited to a dispensing mechanism that utilizes a spiral feed or has a storage area that is visible and/or subdivided into cubicles. Any dispensing system may be used to vend the product 26, such individual cubicles with individual access doors, rotating platforms, mechanized pick-up arms or any other known dispensing mechanism. Likewise, the authorization unit can be of any desired configuration, such as the money handling mechanism 12 for accepting cash, credit or debit cards, or other means of authorization such as private cards, keys or pass-codes.

Figure 3:
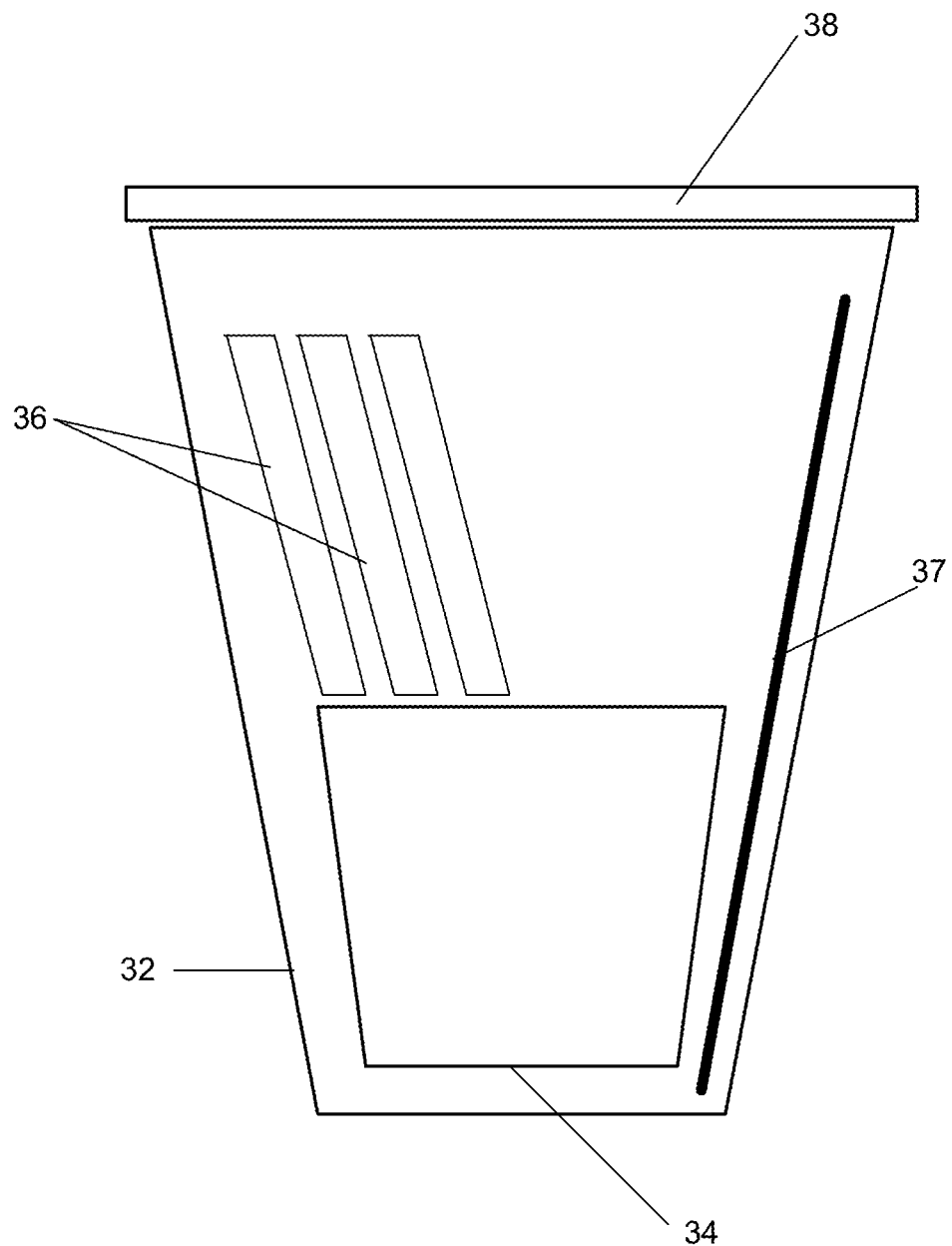
FIG. 3 is a diagram of vendible products for use with the vending machine shown in FIG. 1.

The vendible product 26 comprises a cup 32 having all of the appurtenances required to make and flavor a typical cup of coffee, tea or other such brewed drink using the integrated brewer 20. More particularly, as seen in FIG. 3, the cup 32 contains a 'single serve' brewing cartridge or pack 34, such as coffee or tea K-Cup® packs widely commercially available from Keurig Green Mountain Inc., designed for use with the integrated brewer 20 along with one or more flavoring condiments 36. In preferred embodiments the condiments 36 include one or more (preferably two) sweetener packets and one or more (preferably two) lighteners. The sweeteners may be sugar or a sugar substitute such as Splenda® or other such artificial sweetener. The lighteners may include small capsules or packets of milk, dairy creamer, 'half and half' (being a mixture of milk and creamer), non-dairy creamer, flavored creamer, or powdered creamer. The cup 32 may optionally contain a stir stick 37 and a replaceable lid 38 to encapsulate the contents of the cup 32 and prevent their dispersion as the cup falls towards the access door 22. The lid 37 may also have a slot or other spout in it to allow the consumer to drink through the lid whilst minimizing spills.

The cup 32 may be formed from Styrofoam or other heat transfer resistant material but a paper cup with or without a heat shield such a corrugated paper overlay is also contemplated.

In the most preferred embodiment the vendible product 26 consists of a cup and lid containing one K-Cup® pack, 2 sugar packets, and one powered creamer. [list exactly what you put in the cup].

The cubicles 16 may store the same or different combinations of the product 26. For example, different cubicles 16 may vend different flavors of 'single serve' coffee or tea packs and/or or some cubicles 16 may vend the same flavor of coffee or tea with different combinations of condiments such milk & sugar, cream & sugar, milk & artificial sweetener or cream & artificial sweetener. A variety of such permutations and combinations are possible.

The integrated brewer 20 is secured to the housing 10, i.e., it cannot be casually removed by the consumer. However, in order to reduce the cost of the vending machine 8 (as compared to the fully automatic coffee machines of the prior art which have embedded cup handling and liquid dispensing systems) the integrated brewer 20 utilizes a widely commercially available brewing system which has a user accessible brewing chamber 40 for brewing 'single serve' brewing packs. This enables the user to place the 'single serve' brewing pack 34 into the brewing chamber 40 and, depending on the type of brewing system, remove the spent pack. (Some brew systems automatically eject spent packs into a refuse bin thus obviating the need for the consumer to remove spent packs).

The integrated brewer 20 and the brewing packs 34 dispensed with the vended products 26 are compatible with one another. For example, the integrated brewer 20 may be a K-Cup® system brewer as known in the art per and se vended products 26 may include K-Cup® packs compatible therewith.

The integrated brewer 20 may be connected to a dedicated water supply in order to avoid manual refills of a water reservoir.

The integrated brewer 20 is interlocked with the authorization unit such as the money handling mechanism 12. In other words, the integrated brewer 20 is not operative unless an operation signal is asserted by the money handling mechanism 12 or authorization unit. This prevents use of the brewer 20 without payment or authorization.

The vending machine 8 may be placed in a public space such as a hospital or airport or a quasi-public space such as a private workplace. In a public space it will generally be desirable for the proprietor to set up the vending machine so that the integrated brewer 20 does not become operative until product 26 is vended and thereafter become inoperative once the integrated brewer 20 has gone through a single brew cycle. A timeout can also be employed to restart the brewer lockout and prevent excessive wait times. In a quasi-public setting the proprietor may, if desired, alternatively set up the vending machine so that if a consumer already has a brewing packet, for example one brought from home to the workplace, the consumer can operate the integrated brewer 20 without purchasing the product 26. In this case the proprietor may charge a fee for use of the brewer by itself.

The vending machine 8 described herein is advantageous in that the vended product 26 contains the constituent elements typically required for brewing coffee, tea or other such brewed drink. The inventors herein have experimented with other types of vending machines but have found sub-optimal sales resulting therefrom. For example, the inventors have attempted to dispense only brew packs, leaving the appurtenances such as cup and condiments freely available on a side rack. However, these items tended to become prematurely exhausted thereby reducing sales. The inventors also attempted to use a conventional vending machine that did not have an integrated brewer to dispense cups containing the appurtenances required to make and flavor a typical cup of coffee. The brewer in this case was a separate stand-alone unit. Sales were dramatically affected because, although the wide commercial availability of the brew packs are a selling feature in that consumers know that they are getting a quality product, the wide availability of the brew packs resulted in consumers bringing brew packs from home and using the brewer without cost. As such, the inventors have discovered that the best sales results are obtained with an integrated, user-accessible brewer that is interlocked with the money handling mechanism, and more particularly, where the integrated brewer becomes operative coincident with the purchase of the vendible product 26.

Those skilled in the art will appreciate that a variety of modifications may be made to the embodiments discussed herein without departing from the scope of the invention as defined by the appended claims.

The invention claimed is:

1. A vending machine, comprising:
    a housing incorporating an authorization unit, a storage area for storing vendible product, a dispensing mechanism for dispensing the vendible product, and an integrated brewer;
    wherein the vendible product stored in the storage area comprises a cup containing a brew pack and condiments;
    wherein the integrated brewer is secured to the housing yet has a user-accessible brew chamber in which a consumer can deposit the brew pack associated with the vendible product in order to brew a hot drink;
    wherein the dispensing mechanism is interlocked with the authorization unit such that the dispensing mechanism dispenses vendible product in response to a dispense signal from the authorization unit; and
    wherein the integrated brewer is interlocked with the authorization unit such that the integrated brewer is by default inoperative and becomes operative in response to an asserted operation signal from the authorization unit.

2. A vending machine according to claim 1, wherein upon receipt of a pre-determined payment the authorization unit enables the integrated brewer to operate independent of the dispensing mechanism.

3. A vending machine according to claim 1, wherein the operation signal is de-asserted after a pre-determined time period.

4. A vending machine according to claim 1, wherein the condiments include one or more sweeteners and one or more lighteners.

5. A vending machine according to claim 4, wherein the sweeteners include sugar or artificial sweetener.

6. A vending machine according to claim 4, wherein the lighteners include one or more capsules or packets of milk, dairy creamer, a mixture of milk and creamer, non-dairy creamer, flavored creamer, or powdered creamer.

7. A vending machine according to claim 1, including a lid for encapsulating the contents of the cup.

8. A vending machine according to claim 1, wherein the cup contains a stir stick.

9. A vending machine according to claim 1, wherein the authorization unit is a money handling mechanism.

* * * * *